No. 780,371. PATENTED JAN. 17, 1905.
G. D. MUNSING.
VEHICLE TIRE.
APPLICATION FILED AUG. 11, 1904.
Fig. 1.
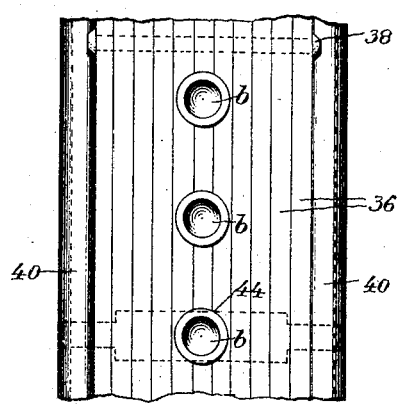
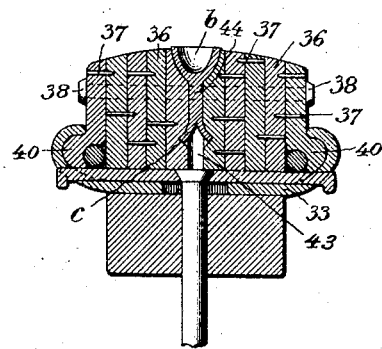
Fig. 2.
Witnesses:
A. F. Ober.
R. V. Sommers.
Inventor.
George D. Munsing
by Henry Orth Jr.
Attys.

No. 780,371. Patented January 17, 1905.

UNITED STATES PATENT OFFICE.

GEORGE D. MUNSING, OF NEW YORK, N. Y.

VEHICLE-TIRE.

SPECIFICATION forming part of Letters Patent No. 780,371, dated January 17, 1905.

Original application filed July 21, 1904, Serial No. 217,515. Divided and this application filed August 11, 1904. Serial No. 220,391.

*To all whom it may concern:*

Be it known that I, GEORGE D. MUNSING, a citizen of the United States, residing at the city of New York, county and State of New York, have invented certain new and useful Improvements in Vehicle-Tires; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to laminated tires, and more particularly to tires of laminæ of leather pegged or otherwise mechanically united, as will be hereinafter described and claimed, and is a division of my application Serial No. 217,515, filed July 21, 1904.

Referring to the drawings, in which like parts are similarly designated, Figure 1 is a plan view of part of a tire made in accordance with this invention; and Fig. 2 is a section of the tire, rim, and felly.

The tire is composed of layers of laminæ 36, that are pegged, nailed, or otherwise mechanically united to form a solid tire, the laminæ being arranged perpendicular to the tread. Pegs or nails 37 unite the several layers to one another, and, if desired, long rivets 38 may be passed through the entire thickness of the tire. The layers are also held together by a suitable thin cement. Between the outer layer or layers and the inner layers near the base of the tire I insert a wire ring of suitable shape in cross-section to form a bead 40, by means of which the tire is held within its rim 33.

Through the tire I bore holes 43 at suitable distances apart and into them countersink rivets 44, having cup-shaped heads *b* and split shanks *c*. A tool is then inserted in the hole from beneath the tire to clench the rivet, or, if desired, a strip of leather with the rivets already inserted can be used as a central lamina. The case may be that the rivets have their shanks already spread at right angles and are inserted between the two central layers as the tire is being made up. The head of the rivet is substantially flush with the tread and prevents the tire from skidding on wet or muddy pavements or roads when the vehicle is moving at a high speed.

It will be observed that when using such a solid tire I unite it to the felly of the wheel by means of a split rim 33.

Having thus described my invention, what I claim as new therein, and desire to secure by Letters Patent, is—

1. A laminated tire and rings between the outer layers and the body of the tire to form a bead on the tire, substantially as described.

2. A laminated leather tire, pegs uniting the laminæ, and rings between the outer laminæ and the body of the tire to form beads at the base of the tire, and on opposite sides thereof, substantially as described.

3. A laminated tire and rivets countersunk in the tread thereof, and having cup-shaped heads.

4. A laminated tire, the laminæ of which are perpendicular to the tread, and rivets countersunk in the tread having cup-shaped heads and split shanks, substantially as described.

5. A laminated leather tire, the laminæ of which are cemented together and perpendicular to the tread, pegs uniting one lamina to another, and rivets in the tread, substantially as described.

6. A solid laminated leather tire, the laminæ of which are cemented together and perpendicular to the tread, pegs uniting one lamina to another, rivets passing through all of the laminæ, rings between the outer laminæ on each side to form a bead, and rivets having cup-shaped heads and split shanks, countersunk in the tire, substantially as described.

In testimony that I claim the foregoing as my invention I have signed my name in presence of two subscribing witnesses.

GEORGE D. MUNSING.

Witnesses:
A. W. CHATFIELD,
JOSEPH J. SMIDT.